US008596192B2

(12) United States Patent
Hauser et al.

(10) Patent No.: US 8,596,192 B2
(45) Date of Patent: Dec. 3, 2013

(54) VEGETABLE CUTTER

(75) Inventors: Lawrence M. Hauser, Auburn, WA (US); Ricky Wai Kit Chan, Bellevue, WA (US); Joanna Clark, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 400 days.

(21) Appl. No.: 12/901,977

(22) Filed: Oct. 11, 2010

(65) Prior Publication Data

US 2011/0192290 A1 Aug. 11, 2011

Related U.S. Application Data

(60) Provisional application No. 61/302,062, filed on Feb. 5, 2010.

(51) Int. Cl.

| | |
|---|---|
| ***A23N 4/04*** | (2006.01) |
| ***A47J 17/00*** | (2006.01) |
| ***A47J 23/00*** | (2006.01) |
| ***A47J 25/00*** | (2006.01) |

(52) U.S. Cl.
USPC .............................................. 99/537; 99/538

(58) Field of Classification Search
USPC ........... 99/501, 507, 509, 510, 537, 538, 539, 99/540, 541, 542, 543, 544, 545
See application file for complete search history.

(56) References Cited

U.S. PATENT DOCUMENTS

| | | | | |
|---|---|---|---|---|
| 2,018,932 | A * | 10/1935 | Thorne | 100/213 |
| 5,216,031 | A * | 6/1993 | Dobson et al. | 99/538 |
| 5,735,193 | A * | 4/1998 | Chang | 99/494 |

* cited by examiner

*Primary Examiner* — Tu B Hoang
*Assistant Examiner* — Lindsey C Teaters
(74) *Attorney, Agent, or Firm* — Lowe Graham Jones PLLC

(57) ABSTRACT

A container includes an internal plate having slicing blade supported by a lower container and covered by a lid. A threaded axle is connected to a hand crank extending from the top of the lid and urges a pusher downward toward the blade as the crank is turned. A food item carried on the pusher is thereby forced downward and rotated against the blade and cut in accordance with the size of the threads on the axle. Additional interchangeable plates are provided, including cheese grating and juice reaming plates.

13 Claims, 6 Drawing Sheets

VEGETABLE CUTTER

PRIORITY CLAIM

This application claims the benefit of prior U.S. provisional application Ser. No. 61/302,062 filed on Feb. 5, 2010.

FIELD OF THE INVENTION

This invention relates generally to devices for cutting vegetables and other food items, particularly including devices for cutting potatoes and other vegetables in a spiral fashion.

BACKGROUND OF THE INVENTION

Many restaurants serve curly fries, which are cut from potatoes in a manner that produces spiral-shaped pieces. Though popular at restaurants, there are no devices that are convenient and easy to use to produce the same spiral pieces at home. Likewise, there are no adequate devices for enabling an adjustable cutting and slicing process for a variety of spiral cuts of different thicknesses, either with or without separating the spiral slices into julienne strips.

SUMMARY OF THE INVENTION

The preferred version of the present invention includes a container having an internal slicing blade. A threaded axle connected to a hand crank urges a pusher downward toward the blade. A food item carried on the pusher is thereby forced against the blade and cut in accordance with the size of the threads on the axle.

In various embodiments as described below, additional features are optionally incorporated, including different blades, grating surfaces, a juice reamer, or others.

DETAILED DESCRIPTION OF THE PREFERRED EMBODIMENT

Figure 1:
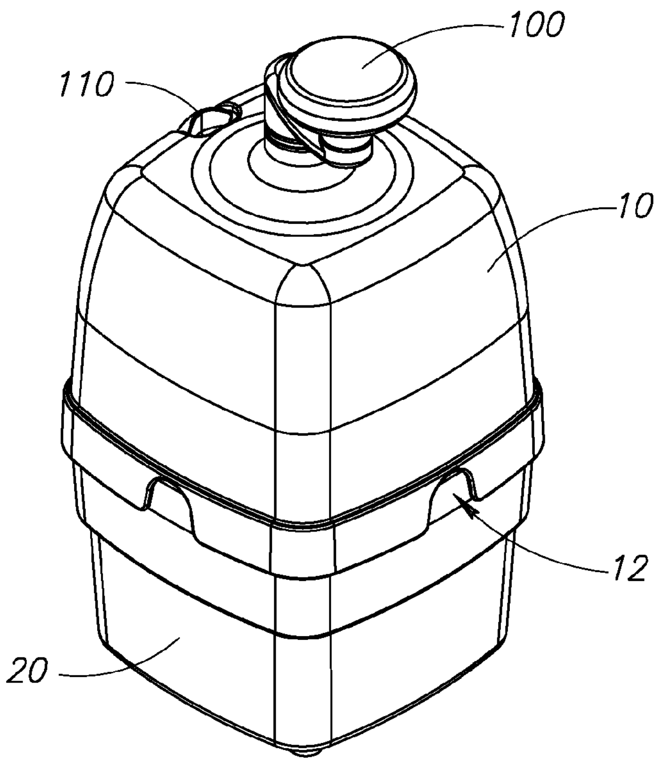
FIG. 1 is a perspective view of a preferred version of a vegetable cutter.
Figure 2:
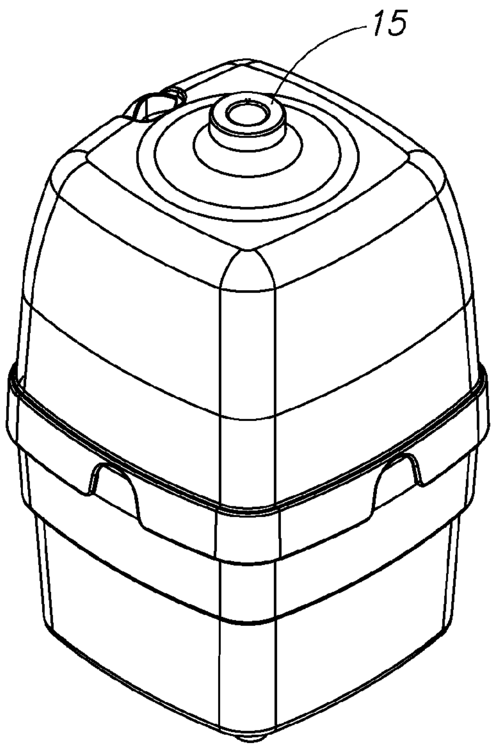
FIG. 2 is a perspective view of the vegetable cutter of FIG. 1, shown partially disassembled.

A preferred vegetable cutter is shown in perspective views in FIG. 1 and FIG. 2, with FIG. 2 providing a partially disassembled view. As explained in greater detail below, a handle and certain other components of the vegetable cutter may be removed and stored in a lower container of the vegetable cutter for more efficient storage of the device.

Figure 3:
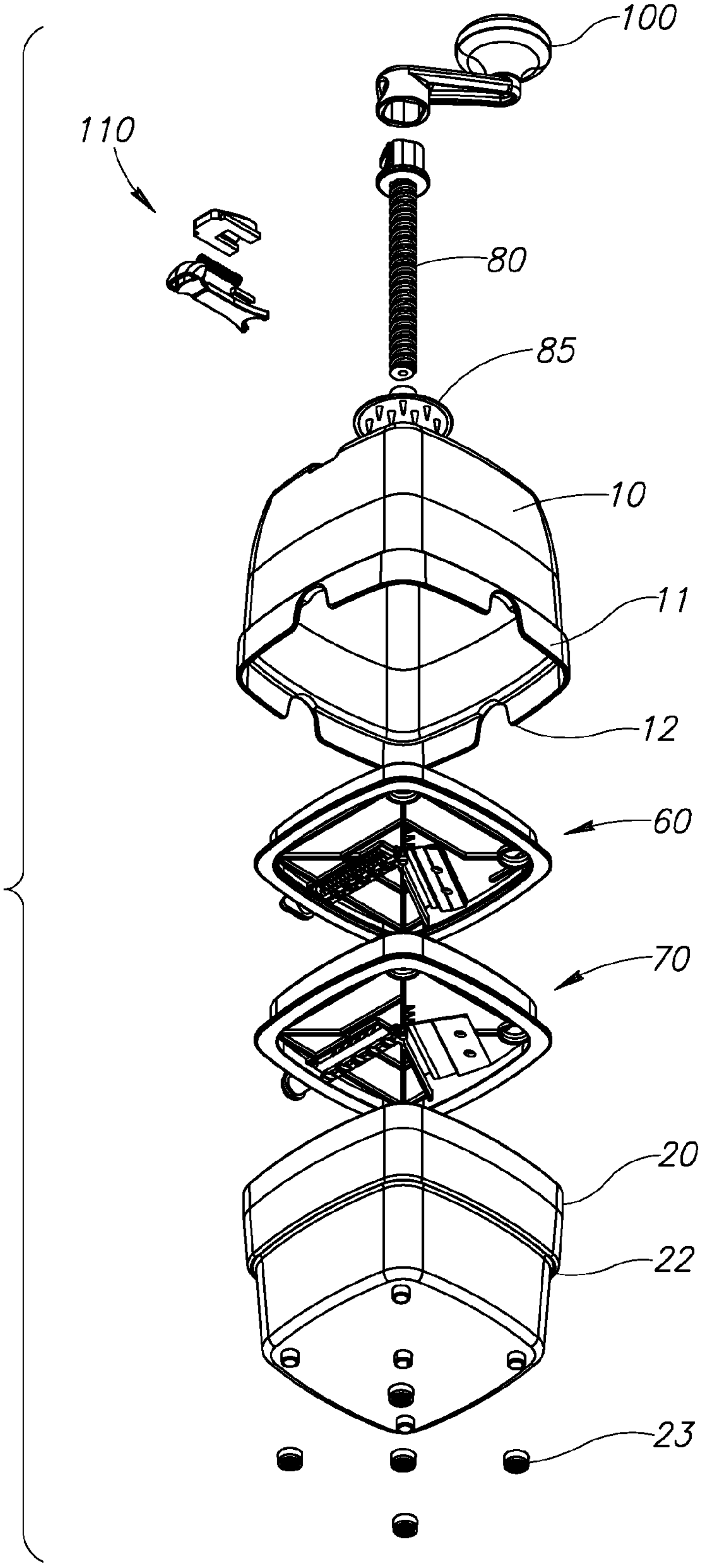
FIG. 3 is an exploded view of a preferred vegetable cutter.

A preferred version of the vegetable cutter is further shown in the exploded view of FIG. 3 which includes a lid 10 removably secured to a lower container 20. As shown, the container has several elastomeric feet 23 to provide a non-skid base. In the version as shown the container is generally rectangular in cross-section, though it may alternatively be round or have any other shape that will allow for cutting and collection of the sliced vegetables as described below.

The container has upwardly extending sidewalls and a means for supporting a slicing plate 60. In the illustrated version, the sidewalk include a lateral transition forming a horizontal seat 22 as the sidewalk progress upward, thereby providing a horizontal support for the slicing plate 60 within the interior cavity formed by the sidewalk.

The lid 10 is also generally rectangular in cross-sectional shape so that it will receive the container within it. As noted above with respect to the container, the lid may alternatively be round or otherwise shaped. Preferably the lid includes a horizontal shoulder 11 formed just above the rim of the lid such that the rim of the lid surrounds the rim of the container, enabling the horizontal shoulder 11 to support the weight of the lid 10 by resting the shoulder on the rim of the container. Alternative methods for allowing the lid to be supported by the container are also possible.

In the preferred version as illustrated the lid forms a raised dome shape providing a substantial volume within the lid. Most preferably, the volume of the lid is equal to or exceeds the volume of the lower container. Likewise, most preferably the height of the lid from the rim to the top is equal to or greater than the height of the lower container from the bottom of the lower container to the rim of the lower container. The height of the lid allows for a complete enclosure of the vegetables being chopped, further protecting the user's hands from coming into contact with any cutting surfaces.

The lid further includes one or more arched cutouts 12 that are sized to allow a julienne knob 50 and shaft 51 to extend through the lid, as described further below. In the illustrated version, the lid includes four such arched cutouts, one being positioned at the rim and slightly off-center with respect to the middle of each of the four sidewalls of the lid. In other versions, the cutouts are positioned at the center of the span between the upper corners of the sidewalls. In the preferred configuration, the lower portion of the lid is symmetrical about a vertical plane that is defined through a central axis extending through the center of the lid.

The lower container includes a similar cutout 24 extending downward from the rim of the lower container along at least one portion of the sidewall of the lower container. The cutout in the lower container likewise allows the shaft and knob to extend through the cutout. Although only one cutout is shown for the lower container, in alternate versions the lower container may include multiple cutouts.

Figure 4A:
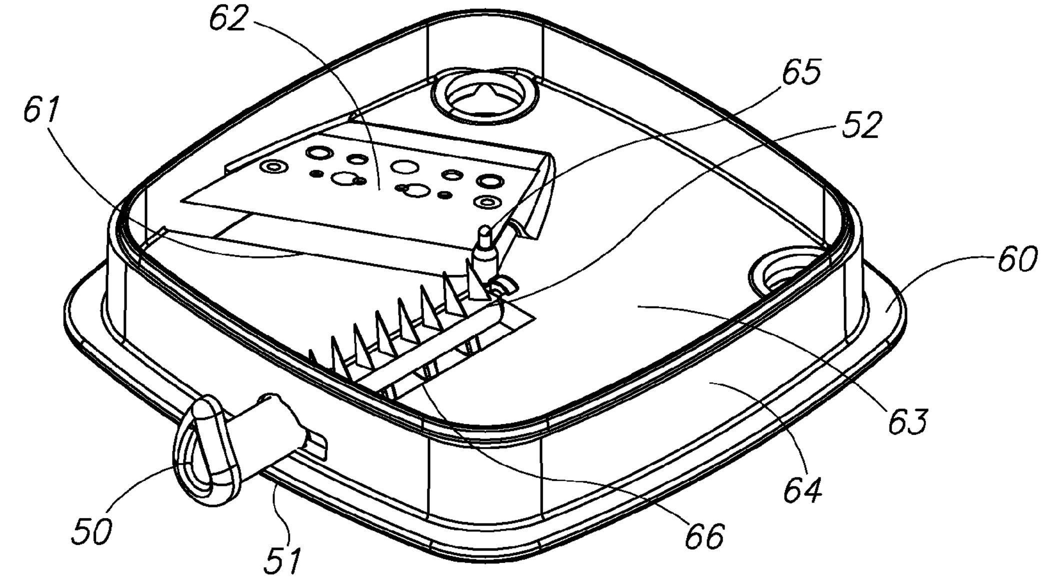
FIG. 4A is a top perspective view of a cutting plate for use with a preferred vegetable cutter.

A first slicing plate 60 is configured to be received within the container 20 where it is supported by the seat 22. In other versions the slicing plate may be supported by the rim, a flange, or other structural members. In the illustrated example, as best seen in FIG. 4A, the slicing plate includes a generally planar central floor 63 having an opening 61 defined between a portion of the floor and a slicing blade 62. A sidewall 64 surrounds the floor of the plate such that the sidewall of the slicing plate is substantially adjacent the sidewalls of the lower container when the slicing plate is in position within the lower container.

In the version as shown, the opening 61 extends generally between approximately the center of the slicing plate and the sidewall. Likewise, a sharpened edge of the slicing blade extends radially from the center of the slicing plate. As such, the opening extends radially outward from the center of the slicing plate. When the slicing plate is in position within the lower container, the opening extends radially outward from a central axis extending vertically through the center of the vegetable cutter. The opening may be created by angling the floor 63 slightly downward, inclining the slicing blade 62 slightly upward, some combination of both, or simply positioning the blade in a plane above the plane of the floor. In any event, the height of the opening 61 defines a slicing thickness in which a potato or other food item passing through the opening is sliced. Thus, the food item will be sliced at a thickness defined by the vertical height between the floor and the slicing blade in the vicinity of the opening.

In some versions of the invention, the slicing blade or the floor may be made to be adjustable such that one or the other can be raised or lowered to allow for a larger or smaller opening. Such adjustments can accommodate thicker slices by adjusting the opening, particularly when paired with an appropriate rod as discussed below. In other versions, and for more controlled slicing and greater durability, the slicing blade and the size of the opening are fixed in a particular slicing plate. In order to provide the ability to slice at varying thicknesses (particularly for use with fixed opening sizes), two or more slicing plates 60, 70 are provided as seen in FIG. 3, each defining a different sized opening and corresponding slicing thickness.

An axial stem 65 extends upward from approximately the center of the slicing plate. The stem 65 is preferably configured to allow a food item such a potato to be pierced by the stem and to be continually urged into and through the potato in order to serve as an axis of rotation for the food item as it is rotated to pass through the opening and be sliced by the blade. The axial stem may be mounted for pivotal movement or may comprise a fixed stem. In addition, the axial stem may terminate in a sharpened edge to facilitate piercing of the food item. As shown, the stem is mounted on the slicing plate to be immediately adjacent an edge of the blade 62 so that the blade will extend fully half way into the food item as it is rotated.

With reference to FIG. 4A, a plurality of julienne blades 52 are supported by a shaft 51 that is carried by the slicing plate and positioned generally in the plane of the floor of the slicing plate. Each of the julienne blades is aligned with one another along the shaft and each includes a sharpened edge facing away from the slicing blade 62 (and therefore toward the oncoming potato or other food item that is rotating toward them). The shaft 51 includes one end that extends through an opening formed in a sidewall of the plate (and also through one of the arched cutouts 12 in the lid and the cutout 24 in the container when the lid is in place over the container). The opposite end of the shaft is pivotally supported by the slicing plate, preferably in the vicinity of the stern 65. A julienne knob 50 is secured to the end of the shaft to allow the user to rotate the shaft as desired in order to selectively extend or retract the blades.

Figure 4B:
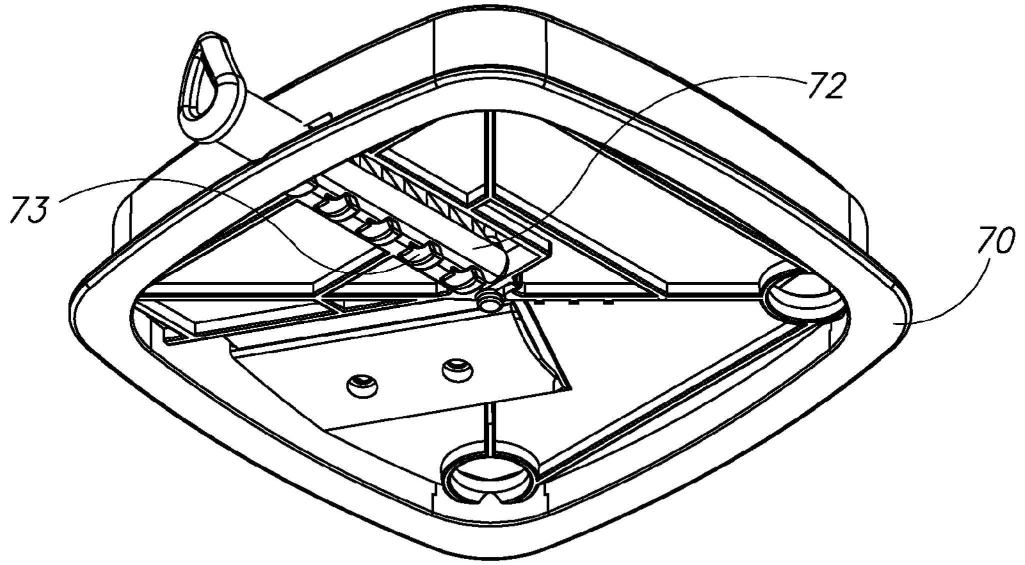
FIG. 4B is a bottom perspective view of a cutting plate for use with a preferred vegetable cutter.

As best seen in FIG. 4B, the shaft is formed with a first substantially flat side 72 that is generally parallel to a plane defined by the sharpened edges of the julienne blades, and a second substantially fiat side 73 lying diametrically opposite the julienne blades and perpendicular to the first flat side. Rotation of the shaft such that the julienne blades are extending upward, through the opening in the plate, causes the second flat side 73 to be adjacent a flat support shelf (which may be formed as several horizontally extending fingers in the version as shown in FIG. 4B). To retract the blades, the shaft is rotated 90 degrees such that the first flat side 72 is supported by the shelf. The flat sides of the shaft interact with the engaged surfaces of the fingers or support shelf to act as a cam to hold the shaft in a desired position. Yet other mechanisms are also possible to extend and retract the julienne blades either above or below the floor of the slicing plate.

Figure 4C:
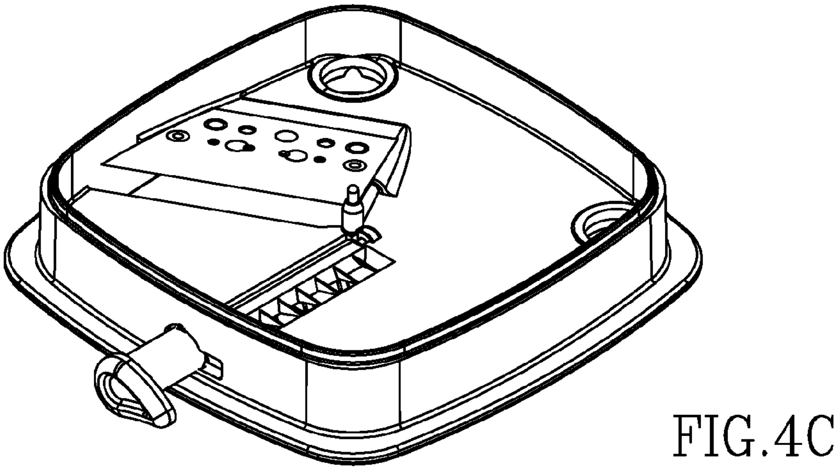
FIG. 4C is a top perspective view of a cutting plate for use with a preferred vegetable cutter, shown with a plurality of julienne blades in a retracted position.
Figure 5:
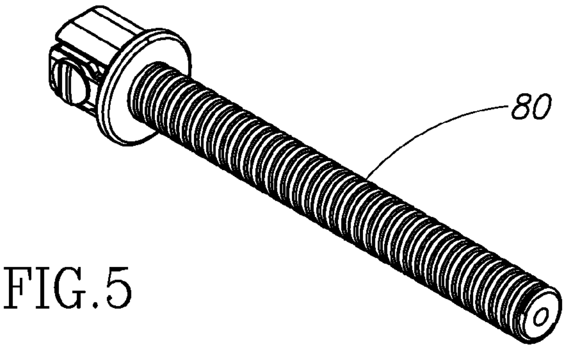
FIG. 5 is a perspective view of a threaded rod for use with a preferred vegetable cutter.

In use, when the julienne blades are extended as shown in FIG. 4A, a potato or other food item passes through the julienne blades and is cut into strips before it is sliced horizontally by the slicing blade 62. When julienne slicing is not desired, the shaft is rotated and the julienne blades are retracted below the level of the floor of the slicing plate, as shown in FIG. 4C. The combined julienne slicing and rotational slicing of a potato produces helical potato slices as with curly fries.

At the top of the lid, substantially at the center, the lid includes a neck 15 having a circular opening for receiving a first end of a threaded rod 80. A first end of the rod extends through the opening and is secured to a crank handle 100. The first end of the rod includes a peripheral flange 81 that is sized such that it is larger than the opening defined in the neck in order to restrict the rod against downward travel through the opening beyond a point defined by the flange. At the second end of the rod a pusher or grip 85 is secured. The grip is generally circular and includes a number of spikes projecting outward and axially away from the rod. The spikes are configured to be insertable into the potato or other food item to hold the potato to the grip so that it can be rotated by the turning of the rod.

Figure 9:
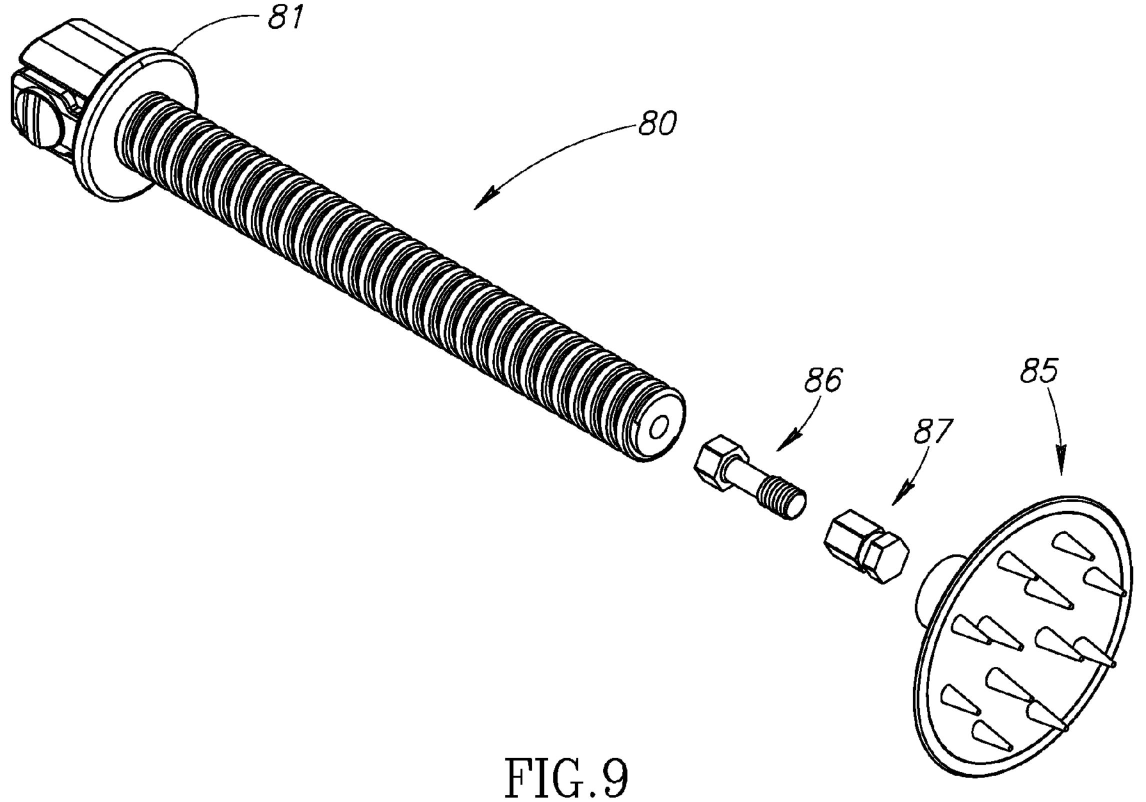
FIG. 9 is an exploded view of a threaded rod and pusher for use with a preferred vegetable cutter.

In the preferred version as shown in FIG. 9, the second end of the rod terminates with a threaded attachment 86 that may be substantially in the form of a bolt that is molded into the threaded rod such that it extends from the end of the rod. A mating female threaded fastener 87 is molded into one end of the grip so that the threaded fasteners may be joined to one another to secure the grip to the second end of the rod. In this configuration, the grip is preferably formed such that is removable from the threaded rod, thereby making the rod and grip removable from the lid for cleaning and storage.

Figure 6A:
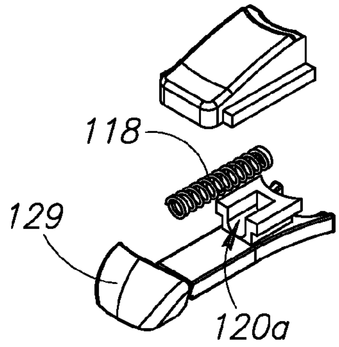
FIG. 6A is a top perspective view of a guide member for use with a preferred vegetable cutter.
Figure 6B:
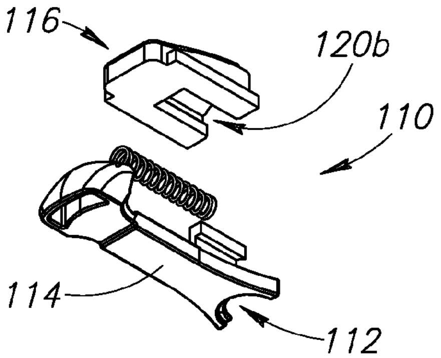
FIG. 6B is a bottom perspective view of a guide member for use with a preferred vegetable cutter.
Figure 7:
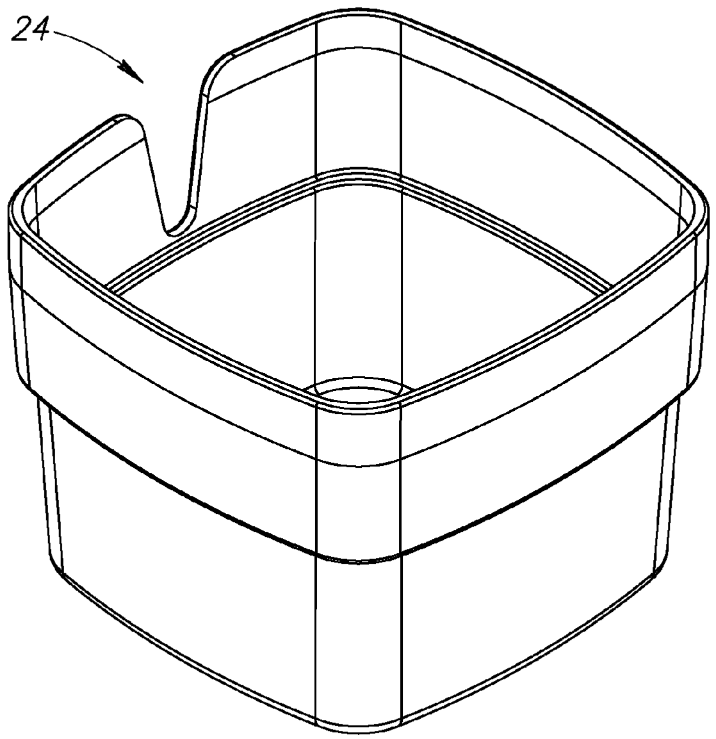
FIG. 7 is a top perspective view of a lower container for use with a preferred vegetable cutter.
Figure 8:
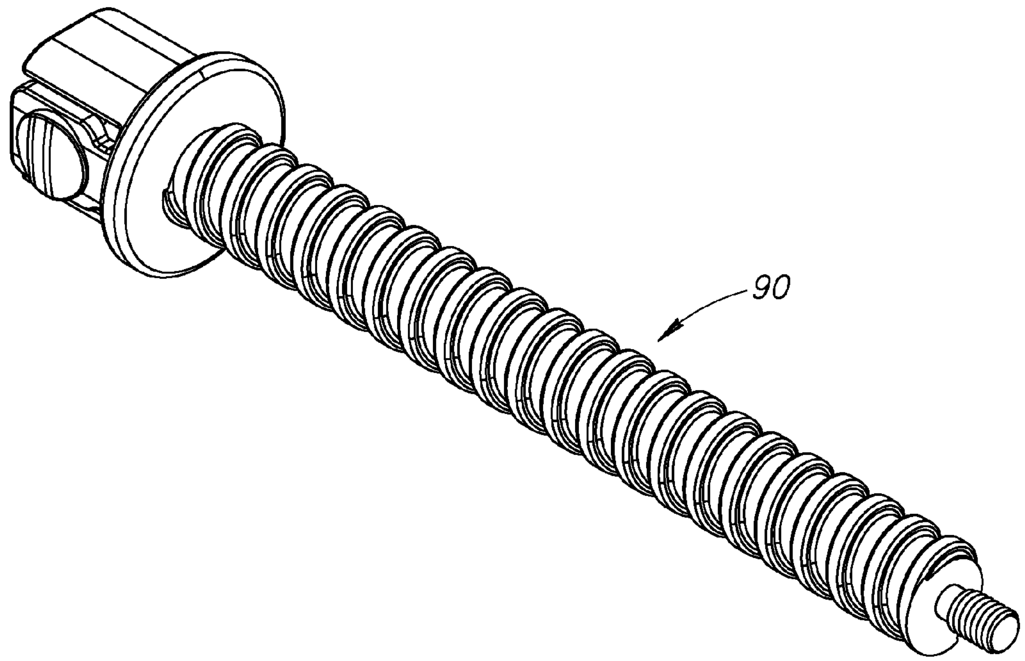
FIG. 8 is a perspective view of an alternate threaded rod for use with a preferred vegetable cutter.

A guide member 110 is further provided at an internal location within the lid and in the version as illustrated it is provided axially below the crank handle. As best seen in FIGS. 6A and 613, the guide member includes one or more projections 112 for receiving the threaded rod and thereby guiding the rod in a fixed vertical axis of rotation. Most preferably, the projection is an arc-shaped surface is sized that is configured to be received within a channel defined by the threads of the rod and to remain engaged with the rod upon rotation of the rod. The guide member includes a lower support member 114 that terminates in the curved edge for receiving the threaded rod. The lower support member 114 of the guide member is axially slideable with respect to an upper support member 116 which is secured to the lid. An internal spring 118 is retained in a cavity 120*a*, 1120*b* between the upper and lower members to urge the two members axially apart from one another and therefore to push the lower support member toward the rod to keep it engaged with the rod. A handle 129 on the lower support member allows the user to grasp the handle to pull the lower support member outward, away from the rod, in order to disengage it for easy axial movement or removal of the rod. When the guide member is assembled in position, the upper portion of the guide member is secured to an inner surface of the lid while the handle of the lower portion of the guide member extends at least partially outside the lid or is otherwise accessible from outside the lid. The lower support member is preferably substantially perpendicular with respect to the central axis of the vegetable cutter and the rod. By grasping the handle and pulling it away from the rod, the curved surface of the guide member is disengaged from the rod, thereby allowing the rod to freely move upward or downward along the central axis. The spring biases the lower member toward the central axis and the rod in order to return the lower member to a position against the rod.

In some versions of the invention, the neck of the lid may further include an internal tube formed within the lid and extending downward into the lid for a distance sufficient to provide stable support to axially align the rod. In one version of the invention, the internal tube has a height of about one inch.

The size and spacing of the threads within the rod, together with the size of the opening 61 within the slicing plate, define the thickness of the slices made by the vegetable cutter. Thus, the steeper the ramp defining the threads (and therefore the greater axial distance traveled by one rotation of the rod) the thicker the slice will be. In one version, a slicing plate and corresponding rod are configured to provide slices of approximately 6 mm. In another version, the slicing plate and corresponding rod are configured to provide slices of approximately 3 mm.

In the illustrated embodiment, two different slicing plates 60, 70 are shown, each having its own corresponding threaded rod 80, 90. In such a version, the threaded rods and slicing plates are matched to allow for a uniform slice. In alternate versions, additional slicing plates and rods may be provided for a greater possible variation in slicing thickness. Preferably the seat 22 of the lower container is positioned at a distance sufficiently below the rim of the lower container such that two or more slicing plates will fit within the container with the lid in place.

In order to slice a potato or other item, a preferred slicing plate is selected and positioned in the lower container. The corresponding rod, having threads matched to the height of the blade opening, is also selected and positioned within the lid and secured to the handle. The food item is secured to the grip, the lid is closed, and the handle may then be rotated to begin slicing, either with or without the julienne blades extended as desired.

Additional or alternative plates and grips may also be used. In one example, the plate is formed as a greater with a plurality of upturned sharpened edges forming a grating surface. In such an example, the grip engages a block of cheese and rotation of the handle and axis causes rotation of the block of cheese. In turn, the cheese engages the cutting surfaces of the greater in order to shred the cheese.

In another example, the plate is configured as a juicer or reamer and includes a central reamer head and one or more peripheral holes extending through the plate to allow juice squeezed from a piece of fruit to flow through into the lower container. In operation as a juicer, the grip engages a half of a fruit such as an orange. Rotation of the handle causes the rod to rotate and the fruit to be pushed downward against the reamer. By pressing the fruit against the reamer, the juice within the fruit is squeezed out.

In a preferred versions, the grip includes a concave shape, although in other versions it may have a flat or planar shape. The concave shape is particularly useful for engaging food items such as potatoes that have a rounded surface, and is likewise useful when used with the juicer plate.

In the preferred version, the multiple slicing plates and rods are configured so that they can be stored within the container and lid when not in use, with multiple plates being stackable on top of the plate that is in position for use. In order to facilitate stacking, the sidewalls of the plates are optionally angled inward slightly such that the inner surface of the sidewalk of a first plate can be snugly received within the outer surfaces of the sidewalk of a second plate. Most preferably, the shoulder or seat defined in the lower container is positioned at a distance below the rim of the lower container such that multiple plates can be stacked on top of one another while in position and supported by the shoulder of the lower container. Likewise, the lid is preferably sized and shaped so that the lid is positionable over the lower container with a plurality of plates in position and stacked atop one another. Most preferably two plates may be stacked, though in alternate versions at least three or four plates may be stacked on top of one another when in position on the shoulder of the lower container and with the lid in position atop the lower container.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. A vegetable cutter, comprising:

a lower container having a base and upwardly extending sidewalls terminating in a lower container rim and defining a first interior space within the lower container, the lower container further defining a support within the first interior space;

a vegetable processing plate having a food processing surface, the plate further having an upper side and a lower side, the plate being carried on the support and positioned within the first interior space to define a collection space between the base of the lower container and the lower side of the plate, the plate further defining at least one hole defining a passageway between the upper side of the plate and the collection space of the lower container;

the vegetable processing plate further having a first peripheral sidewall surrounding a first substantially planar central floor, the food processing surface further comprising a first opening formed in the first central floor adjacent a first blade, the first opening and the first blade each being adjacent to one another and defining a first height from the first opening to the first blade, the first opening and the first blade further extending along a radial from the central axis toward one of the sidewalls of the lower container when the plate is in position within the lower container;

a plurality of julienne blades extending perpendicularly to the first substantially planar floor, the plurality of julienne blades being positioned and aligned along a second radial from the central axis;

the plurality of julienne blades further being carried on a shaft, the shaft being supported by the vegetable processing plate and mounted for rotational movement substantially parallel to the planar central floor, whereby rotation of the shaft causes the plurality of julienne blades to be selectively retracted below or extended above the central floor;

a lid carried on the lower container to substantially cover the lower container, the lid having a lower portion forming a lid rim and a raised upper portion terminating in a lid top, the lid defining a second interior space, the lid top further having a neck forming a passage into the second interior space;

a threaded rod having a first end and a second end and being positioned substantially along a central axis defined at a center of the vegetable cutter, the first end of the rod being received within the neck of the lid, the first end of the rod further being connected to a crank handle secured to the rod to enable axial rotation of the rod when the crank handle is rotated;

a grip attached to the second end of the rod, the grip being configured to engage a food item; and a guide member supported by the lid and engaged with the threaded rod;

whereby rotation of the threaded rod causes axial movement of the threaded rod by engagement of the threaded rod with the guide member, thereby moving the grip and food item toward the food processing surface of the plate.

2. The vegetable cutter of claim 1, wherein the first opening and the first blade are parallel to one another.

3. The vegetable cutter of claim 1, wherein the height of the first opening is fixed and further wherein the threaded rod defines threads having a thread size that is matched to the height of the opening, whereby when the threaded rod is rotated the food item is moved downward and rotated a distance that is substantially matched to the height of the opening.

4. The vegetable cutter of claim 3, further comprising a second plate, the second plate having a second peripheral sidewall surrounding a second substantially planar central floor and a second opening formed in the second central floor adjacent a second blade, the second opening and the second blade each being adjacent to one another and defining a second height from the second opening to the second blade, the second opening and the second blade further extending along a radial from the central axis toward one of the sidewalls of the lower container when the plate is in position within the lower container, wherein the first height is greater than the second height.

5. The vegetable cutter of claim 4, further comprising a second threaded rod, the second rod defining a second thread size that is matched to the second height of the second opening.

6. The vegetable cutter of claim 3, further comprising a guide, the guide engaging the threads of the threaded rod to cause the rod to move toward the plate when the crank handle is rotated.

7. The vegetable cutter of claim 6, wherein the guide is attached to the lid, the guide further having a first end engaged with the threaded rod and a second end extending outside the lid, the second end forming a surface for grasping to enable the guide to be disengaged from the threaded rod.

8. The vegetable cutter of claim 7, further comprising a spring for biasing the guide into engagement with the threaded rod.

9. The vegetable cutter of claim 8 wherein the grip is removably attached to the threaded rod.

10. The vegetable cutter of claim 9, wherein the crank handle is removably attached to the threaded rod.

11. The vegetable cutter of claim 1, wherein the vegetable processing plate further comprises a plurality of cutting surfaces forming a grater.

12. The vegetable cutter of claim 1, wherein the food processing surface further comprising a reamer.

13. The vegetable cutter of claim 1, further comprising a plurality of vegetable processing plates, the lid and the lower container being sized and configured such that the plurality of vegetable slicing plates are supported by the support when the lid is in position over the lower container.

* * * * *